United States Patent [19]
Copeland et al.

[11] Patent Number: 5,507,342
[45] Date of Patent: Apr. 16, 1996

[54] METHOD OF SELECTIVE TREATMENT OF OPEN HOLE INTERVALS IN VERTICAL AND DEVIATED WELLBORES

[75] Inventors: David L. Copeland, Midland; Alfred R. Jennings, Jr., Plano, both of Tex.

[73] Assignee: Mobil Oil Corporation, Fairfax, Va.

[21] Appl. No.: 342,944

[22] Filed: Nov. 21, 1994

[51] Int. Cl.$^6$ .......................... E21B 43/12; E21B 33/13
[52] U.S. Cl. .................. 166/279; 166/305.1; 166/67
[58] Field of Search .................................. 166/268, 269, 166/270, 295, 308, 307, 300, 279, 305.1

[56] References Cited

U.S. PATENT DOCUMENTS

| | | | |
|---|---|---|---|
| 3,898,167 | 8/1975 | Crowe | 166/307 X |
| 4,139,060 | 2/1979 | Muecke et al. | 166/281 |
| 4,151,879 | 5/1979 | Thomas | 166/307 |
| 4,267,887 | 5/1981 | Watanabe | 166/300 |
| 4,509,598 | 4/1985 | Earl et al. | 166/308 |
| 4,662,448 | 5/1987 | Ashford et al. | 166/290 |
| 4,798,245 | 1/1989 | Frank | 166/281 |
| 4,883,124 | 11/1989 | Jennings, Jr. | 166/307 |
| 4,917,185 | 4/1990 | Jennings, Jr. et al. | 166/281 |
| 4,951,751 | 8/1990 | Jennings, Jr. | 166/285 |
| 5,238,067 | 8/1993 | Jennings, Jr. | 166/307 |
| 5,291,949 | 3/1994 | Dovan et al. | 166/295 |

OTHER PUBLICATIONS

Case Study of the Effectiveness of Nitrogen Foam and Water–Zone Diverting Agents in Multistage Matrix Acid Treatments/by D. K. Kennedy, F. W. Kitziger and B. E. Hall/May 1992.
Effect of Foams Used During Carbonate Acidizing/by M. G. Bernadiner, K. E. Thompson and H. S. Fogler/Nov. 1992.

Primary Examiner—Frank S. Tsay
Attorney, Agent, or Firm—Alexander J. McKillop; George W. Hager, Jr.

[57] ABSTRACT

A method for repairing damaged sections of an oil well includes the use of a combination of two fluids, pumped simultaneously to allow treatment of a specific part of a portion of an oil producing zone. A first fluid is pumped down a coiled tubing and a second fluid is pumped down the annulus formed by the coiled tubing and the production tubing. Because of density differences in the two fluids, diversion is facilitated, treating the lower part of the pay zone with the first fluid and the second fluid to keep the first fluid away from the upper section of the open hole. The coiled tubing could be raised or lowered during this procedure to help ensure desired zone coverage.

11 Claims, 1 Drawing Sheet

U.S. Patent
Apr. 16, 1996
5,507,342
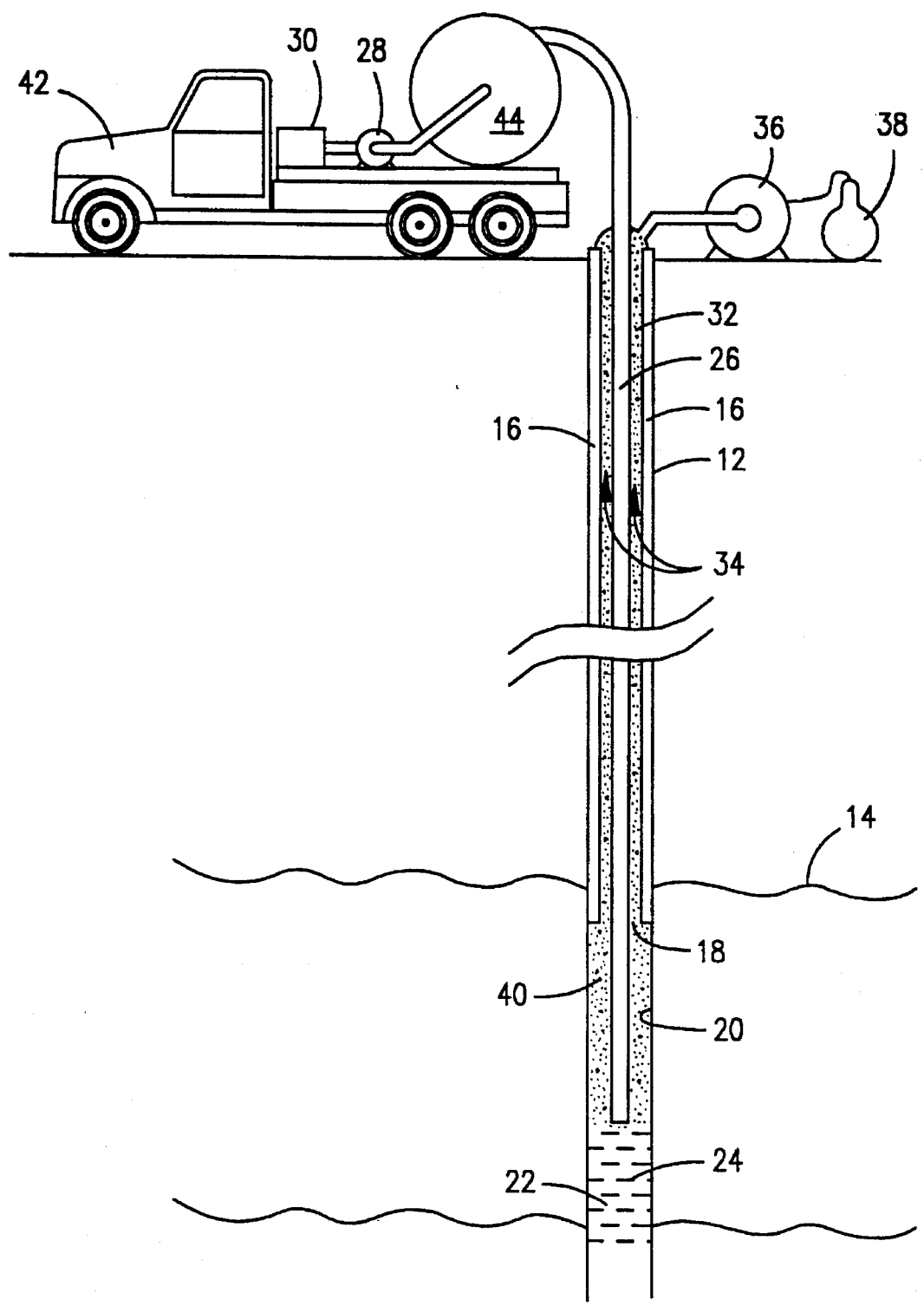

METHOD OF SELECTIVE TREATMENT OF OPEN HOLE INTERVALS IN VERTICAL AND DEVIATED WELLBORES

BACKGROUND OF THE INVENTION

1. Field of the Invention

The present invention pertains to oil well damage removal and more particularly to a method for selective sectional damage removal while isolating undamaged sections from repair fluids.

2. Related Prior Art

In many well consolidated formations, it is common practice in the oil field to drill through an extensive pay section and set a production casing near the top of the drilled-out zone. This leaves an extensive open-hole section open to flow into the production tubing. These "open hole completions" provide excellent access to hydrocarbons contained in the producing zone.

On occasion, however, because of formation damage which may be caused by drilling, well completions, subsequent well workovers, or production, it becomes necessary to perform a well stimulation treatment on the zone. It is important to strategically place the stimulation fluid to be able to effectively remove the damage. These stimulation fluids take the form of hydrochloric acid or organic/hydrochloric acid blends in carbonates and mixtures of hydrofluoric/hydrochloric acid in sandstones. There are a number of reasons one would want to strategically place the treating fluid in such applications. For example, there may be a high permeability zone in the top of the open hole section while the severely damaged lower section may have much lower effective permeability. Also, the lower damaged section may have close proximity to water or the upper section may have close proximity to the gas cap.

There are several methods for providing increased production of oil in different types of formations, particularly carbonate formations and these give cautions regarding the use of fluids such as hydrochloric acid or hydrochloric acid blends. Several patents and articles are listed below that deal with injecting reactive fluids downhole for the stimulation of oil production and also discuss diverting agents.

U.S. Pat. No. 4,883,124, titled "Method of Enhancing Hydrocarbon Production in a Horizontal Wellbore in a Carbonate Formation", issued to Alfred R. Jennings, Jr., relates to a two step process to stimulate a horizontal wellbore drilled into a carbonate formation. Initially, the wellbore is filled with acid. Because vertical communication exists in the vicinity of the wellbore, the acid enters into the fissures and cracks from the wellbore. Thereafter, a non-reactive displacement fluid, having a density greater than the acid, is injected into the wellbore. This more dense displacement fluid pushes the acid to greater depths into the formation so carbonate dissolution can take place which can substantially increase the formation's permeability. Increased permeability enhances the production of hydrocarbonaceous fluids through an increase in the flow rate.

U.S. Pat. No. 5,238,067, titled "Improved Means of Fracture Acidizing Carbonate Formations", issued to Alfred R. Jennings, Jr., relates to a method to improve fracture acidizing in a carbonate containing formation. Initially, the formation is hydraulically fractured so as to form a fracture in the formation in a preferred direction. Thereafter, an acid is directed into the fracture so as to etch the fracture's face and create channels therein. Afterwards, a viscous fluid is directed into the fracture. This fluid contains a material sufficient to serve as a diverter and prevent growth in the existing fracture. Once the diverting material is in place, hydraulic fracturing is again conducted within the existing fracture whereupon fracturing forces are directed away from the diverter so as to form a branched fracture to contact hydrocarbonaceous vugs in the formation. The steps of fracturing acidizing, and .diverting are continued until a vuggy area in the formation has been interconnected with the fracture system.

U.S. Pat. No. 4,917,185, titled "Method to Improve Matrix Acidizing in Carbonates", issued to Alfred R. Jennings, Jr., relates to a process for improved acidizing in carbonate formations, where controlled pulse fracturing (CPF) is utilized in combination with a retarded acid and a solidifiable gel. The solidifiable gel forms a solid formation gel in a zone of greater permeability and a gel plug in the wellbore. The gel is formed from a melamine formaldehyde resin and a cross-linkable polymer. An inhibited acid is placed in an interval of the formation having lessened permeability. The retarded acid comprises hydrochloric, formic, acetic acid or mixtures thereof which is placed in a wellbore adjacent the area to be treated. The acid can contain retarders and corrosion inhibitors sufficient to make the acid stable in the wellbore. At least one CPF device is placed in the acid near the interval to be treated. Upon detonation of the device, acid is forced into the interval of lessened permeability, thereby enhancing the acidizing treatment.

U.S. Pat. No. 4,951,751, titled "Diverting Technique to Stage Fracturing Treatments in Horizontal Wellbores", issued to Alfred R. Jennings, Jr., relates to a method for staging a fracturing treatment in a horizontal wellbore where solidified gel is used as a diverting medium. A desired section of the horizontal wellbore farthest removed from the angle of deviation from vertical of the wellbore is perforated. Through the use of perforations contained in the horizontal section, the desired interval is fractured hydraulically. The gel is displaced with a wiper plug and the gel confined to the fractured interval and wellbore area adjacent the fractured interval. Here the gel forms a solid gel in the interval and a gel plug in the wellbore. Afterwards, another section of the horizontal well is perforated. Thereafter, a second desired interval is fractured. After completion of the fracturing process, the gel plug breaks and the wiper plug is pumped to the farthest end of the horizontal wellbore.

"Case Study of the Effectiveness of Nitrogen Foam and Water-Zone Diverting Agents in Multistage Matrix Acid Treatments" by D. K. Kennedy, SPE, and F. W. Kitzinger, Chevron U.S.A. Inc., and B. E. Hall, SPE, The Western Co., published in *SPE Production Engineering,* May 1992, states that several oil wells producing water have been stimulated successfully with multistages of mud acid, nitrogen foam, and water zone diverting agents. This procedure has improved well performance significantly while having little or no effect on post-treatment water production. The effectiveness of the diverters was analyzed with radioactive tracers, gamma spectroscopy logs, and surface pressure equipment. Results indicate that water zone diverters and nitrogen foam are effective diverters when used in matrix acid stimulations. Case histories and associated data are included in this paper.

"Effect of Foams Used During Carbonate Acidizing" by M. G. Bernadiner, SPE, K. E. Thompson, SPE, and H. S. Fogler, SPE, U. of Michigan, published in *SPE Production Engineering,* November 1992, states that although acidization has been used successfully for many years to increase the productivity of petroleum wells in carbonate formation, demands on the performance and application of the acidizing process are increasing. This study investigated a method of in-situ foam generation that allows deeper wormhole penetration yet uses less acid than conventional methods. The dissolution patterns were imaged with neutron radiography, which provided an in depth understanding of the effects of foam and other critical parameters. Results show that foam is effective in promoting efficient stimulation, even at low acid injection rates.

SUMMARY OF THE INVENTION

The present invention provides a method and apparatus for the use of a combination of two fluids, one such as Nitrogen foam and the other such as acid, which are pumped simultaneously down an oil producing well to allow treatment of a specific part of the producing well. In the present invention, acid is pumped down a coiled tubing lowered down a wellbore and nitrogenated foam is pumped down the annulus formed by the coiled tubing and the production tubing. Because of density differences in the acid and the foam, diversion could be facilitated with the acid. In this application, the lower part of the pay zone is treated with the acid. The foam serves to keep the reactive fluid, acid, away from the upper section of the open hole. The coiled tubing may be raised or lowered during this procedure to help ensure desired zone coverage at the pressure of the leaving the coiled tubing.

BRIEF DESCRIPTION OF THE DRAWINGS

The attached Figure is a cross sectional illustration of a typical oil producing wellbore.

DESCRIPTION OF THE PREFERRED EMBODIMENT

As stated previously, oftentimes, it is a common practice in an oil field to drill through an extensive pay section and set a production casing near the top of the drilled out zone, leaving an extensive Open hole section to provide excellent access to allow increased hydrocarbon flow into the production tubing. However, often the open hole completion becomes damaged or clogged reducing permeability and as a result, hydrocarbon fluid flow, to diminish the desirability of the open hole completion.

The method of the present invention uses a combination of two fluids, a neutral foam and an acid-based fluid to provide the desired flow of hydrocarbon flow. These two fluids are pumped simultaneously to allow treatment of a specific part of the interval.

Referring now to the attached Figure, an oil wellbore 12 is illustrated as having a been drilled through an extensive pay section 14. In completing the oil well, a production casing 16 has been set along the entire length of wellbore 12, up to pay section 14. Production casing 16 is illustrated as ending near the top 18 of a drilled out zone 20 of wellbore 12. This leaves an extensive open hole section 22 open to flow into the production casing 16.

In the case illustrated in the Figure, an acid-based or reactive fluid 24 is pumped down a coiled tubing 26 by a pump 28. Pump 28 may be any type that is capable of handling corrosive fluids such as acids. In the preferred embodiment, reactive fluid 24 is preferably an acid such as hydrochloric acid or a hydrochloric acid blend. This acid may be injected or placed into coiled tubing by glass container 30, which may be any means commonly used in the art for handling fluids that are as corrosive as hydrochloric acid.

In the present invention, a neutral foam 32 is pumped down annulus 34 formed by the space between coiled tubing 26 and production casing 16 by pump 36. Pump 36 may be any type currently in use in the art and can be seen, need not be of the same type as pump 28 since it need not handle reactive fluids but needs to handle fluids with a low specific gravity. Neutral foam 32 is preferably injected into annulus 34 using pressurized nitrogen source 38 and neutral fluid, however, any means currently in use in the art is acceptable. Neutral foam 32 is preferably a nitrogen based foam, but any neutral foam is adequate as long as the specific gravity of neutral foam 32 is less than that of reactive fluid 24.

Diversion is accomplished primarily because of density differences in reactive fluid 24 and neutral foam 32. Reactive fluid 24, which may be an acid, typically has a specific gravity from about 1.05 to about 1.20. Neutral foam 32, which may be a nitrogen based foam, typically has a specific gravity from about 0.4 to about 0.8. As a result, diversion as depicted in FIG. 1 is facilitated. Neutral foam 32, under pressure from above, with its significantly lower specific gravity, holds its position blocking intrusion of reactive fluid 24 into the cased uphole portion of wellbore 12. Reactive fluid 24, with its higher specific gravity, sinks down and in fact is forced down by the pressure from neutral foam 32. The uphole pressure exerted by reactive fluid 24 achieves an equilibrium with the pressure exerted from uphole by neutral foam 32 and increased fluid flow from coiled tubing 26 forces reactive fluid 24 into pay section 14 through open hole section 22 of drilled out zone 20.

In the application illustrated in the attached Figure, the lower part of the pay section 14, open hole section 22, is treated with reactive fluid 24 and neutral foam 32 serves to keep the reactive fluid 24 away from an upper section 40 of open hole section 22. In the present invention, coiled tubing 26 may be raised or lowered during the procedure of the present invention to help ensure desired zone coverage. This can be accomplished through the use of truck 42 upon which a roll 44 for coiled tubing 26 is loaded.

It is also apparent to those skilled in the art that other fluid/fluid, foam/foam, foam/fluid, and fluid/foam combinations could be used to accomplish the intent and aim of this invention.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A method of repairing damaged areas in producing wellbores comprising the steps of:

inserting a coiled tubing down the wellbore to the damaged area;

pumping a first acid based fluid having a first specific gravity down said coiled tubing;

pumping a second fluid having a second specific gravity, said second specific gravity being less than said first specific gravity of said first acid based fluid, down said wellbore outside of said coiled tubing; and raising and lowering said coiled tubing to treat the damaged area by using density differences of said first acid based fluid and said second fluid to isolate the damaged areas in contact with said first acid based fluid.

2. The method according to claim 1 wherein said step of injecting said acid based fluid includes the step of:

providing a hydrochloric acid blend as said acid based fluid.

3. The method according to claim 1 wherein said step of pumping said second fluid includes the step of:

injecting a diverting agent into said wellbore outside of said coiled tubing as said second fluid.

4. The method according to claim 3 wherein said step of injecting said diverting agent includes the step of:

providing a neutral foam as said diverting agent.

5. The method according to claim 4 wherein said step of providing said neutral foam includes the step of:

providing a nitrogen foam as said neutral foam.

6. A method of repairing damaged areas in producing wellbores comprising the steps of:

inserting a coiled tubing down the wellbore to the damaged area;

pumping a hydrochloric acid blend down said coiled tubing;

pumping a nitrogen foam, having a specific gravity less than the specific gravity of said hydrochloric acid blend, down said wellbore outside of said coiled tubing; and raising and lowering said coiled tubing while pumping said hydrochloric acid blend down said coiled tubing to treat the damaged area.

7. A system for repairing damaged areas in producing wellbores comprising:

a coiled tubing inserted down the wellbore to the damaged area;

means for pumping a first acid based fluid having a first specific gravity down said coiled tubing;

means for pumping a second fluid having a second specific gravity, said second specific gravity being less than said first specific gravity of said first acid based fluid, down said wellbore outside of said coiled tubing; and means for raising and lowering said coiled tubing to treat the damaged area.

8. The system according to claim 7 wherein said acid based fluid includes a hydrochloric acid blend.

9. The system according to claim 7 wherein said means for pumping said second fluid includes:

means for injecting a diverting agent into said wellbore outside of said coiled tubing as said second fluid.

10. The system according to claim 9 wherein said diverting agent includes a neutral foam.

11. The system according to claim 10 wherein said neutral foam includes a nitrogen based foam.

* * * * *